Figure 1:
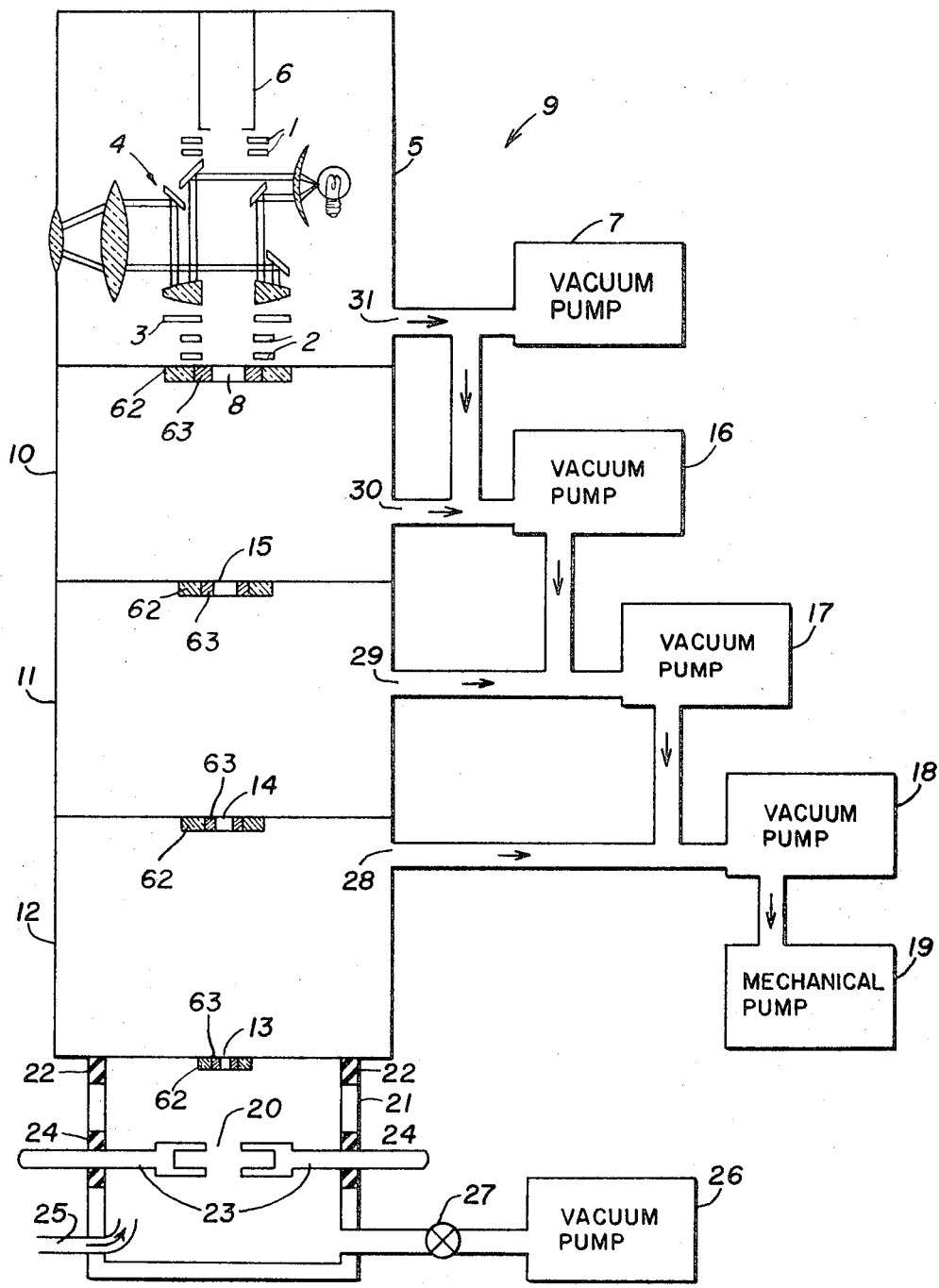

United States Patent

[11] 3,585,349

[72] Inventor David C. Kalbfell
San Diego, Calif.
[21] Appl. No. 273,156
[22] Filed Apr. 15, 1963
[45] Patented June 15, 1971
[73] Assignee Rohr Corporation
Chula Vista, Calif.

[54] NONVACUUM ENVIRONMENTALLY CONTROLLED ELECTRON BEAM
12 Claims, 2 Drawing Figs.
[52] U.S. Cl. .................................................. 219/121EB
[51] Int. Cl. .................................................. B23k 9/00
[50] Field of Search .................................... 219/121,
117, 69; 250/49.5; 313/231

[56] References Cited
UNITED STATES PATENTS

| | | | |
|---|---|---|---|
| 2,793,281 | 5/1957 | Steigerwald | 219/E.B. |
| 2,883,544 | 4/1959 | Robinson | 219/E.B. |
| 2,899,556 | 8/1959 | Schopper et al. | 219/E.B. |
| 2,981,823 | 4/1961 | Candidus | 219/E.B. |
| 3,156,811 | 11/1964 | Barry | 219/E.B. |
| 3,171,943 | 3/1965 | Niedzielski | 219/121 |

FOREIGN PATENTS

| 1,326,248 | 3/1963 | France | 219/E.B. |
|---|---|---|---|

Primary Examiner—J. V. Truhe
Assistant Examiner—L. Rouse
Attorney—George E. Pearson ABSTRACT: The invention relates to apparatus for bringing an electron beam outside the high vacuum chamber of its electron gun to direct the same onto a workpiece. The apparatus comprises beam aligning means, a visual optical system, at least one buffer vacuum chamber, means for surrounding the beam with a shield gas, and pumping mans individual to each chamber for individual pumping of them. The high vacuum chamber and buffer chamber have pyrex windows disposed within the field of view of the optical system. The high vacuum and buffer chambers also have aligned flow limiting orifices drilled in the said windows for passing the beam from the high vacuum chamber to the workpiece, one of the orifices interconnecting the two chambers and the other orifice being the exit orifice adjacent the workpiece.

INVENTOR.
D. C. KALBFELL

INVENTOR.
D. C. KALBFELL
BY George E. Pearson
ATTORNEY

NONVACUUM ENVIRONMENTALLY CONTROLLED ELECTRON BEAM

This invention relates generally to electron beam welding, and the like operations using an electron beam, and more particularly to a new and improved electron beam welding system which retains all the advantages of the electron beam welding process while also making provision for focusing the beam on a workpiece disposed outside the high vacuum environment of the electron gun chamber, thereby to render the welding machine portable and to thus also make possible applications of the electron beam welding process to the joining of refractory and super alloy assemblies of complex and varied configurations without requiring the large vacuum work chambers heretofore employed to accomplish such operations and without requiring that the high vacuum be broken to remove the work.

Heretofore, it has been the practice to enclose and maintain the workpiece in a high vacuum which necessarily entails the use of a so-called work chamber wherein the workpiece is confronted by the electron beam. The capacity of the welding machine is thus limited in accordance with the size of the work chamber which, notwithstanding its size, must provide the proper vacuum environment for maintenance of the electron beam. The prior art machines operate with a pressure inside the gun and work chamber of the order of 0.1 micron of mercury (Hg.). This near vacuum is necessary to allow generation and propagation of the electron beam and to protect the emitter from oxidation. Any significant amount of air or gas in the chamber would also dissipate the beam energy by absorption.

Theoretically, the electron beam could be passed into the atmosphere through a pin hole provided in the electron gun chamber, and thence to a workpiece disposed in the atmosphere closely adjacent to the exit hole, it being known that the electrons will exhibit some pumping action on the gas atoms in the exit hole area and that an electron accelerated through a potential of about 30,000 volts will travel a distance of about 0.44 inch in air. The pump requirements to maintain the necessary high vacuum under such leakage conditions, however, would be prohibitive and impracticable, if at all possible. Also, in theory, a suitable material such as beryllium or aluminum could be used to form a window in the electron gun chamber for the passage of the electron beam therethrough to thus avoid the severe pumping requirements of an exit hole arrangement. For high powered welding applications, however, a beryllium window would be impracticable since, with low voltage electrons of the order of 30,000 volts, the window would absorb sufficient energy to melt the same. Voltage high enough to avoid this melting, on the other hand, would present a hazard to equipment and operating personnel because of the strong emission of X-rays.

In accordance with the electron beam welding system of the present invention, a buffering chamber principle of operation is employed which reduces the vacuum pump power requirements in the overall system and, nevertheless, maintains a suitable vacuum environment for operation and propagation of the electron beam while also permitting the same to be operated on the workpiece at or near atmospheric pressure and outside said vacuum environment. Pursuant to this mode of operation, the electron beam is passed from the electron gun chamber to the externally disposed workpiece by way of a plurality of buffer chambers which are connected to the vacuum pump system. One or more such buffer chambers may be employed depending upon the characteristics of the pumps which are used for the purpose and depending upon the rate of influx into the electron gun chamber of inert shield gas which is caused to flow over the workpiece to prevent oxidation and contamination of the weld. Any inert gas suitable for the purpose may be employed such, for example, as helium and argon. Helium shield gas is preferred to argon because the beam energy absorbed by helium is only 0.1 that of argon.

In accordance with a preferred embodiment of the invention, a conventional beam welder such, for example, as the Hamilton Electrona 2KW Electron Beam Welder is adaptable for the purpose, the electrons emitted from the heated tungsten filament of the welder being focused into a beam which is directed through the gun chamber and thence by way of successive orifices through the aforesaid buffer chambers, and thence through a shield gas chamber to focus on the workpiece outside the machine. The buffer chambers are operated at progressively lower vacuums in accordance with the aforedescribed buffer chamber principle. The orifice into each chamber acts as a sonic choke to limit the flow into the following chamber. Two such buffer chambers reduce this flow to a level which is readily handled by two vacuum pumps of reasonable size in addition to the pumping system conventionally employed with the electron beam welder by itself. A flow of shield gas passes the last orifice through which the electron beam passes before impinging on the workpiece. The weld area of the workpiece is thus completely surrounded by a continuing flow of the shield gas to protect the weld from oxidation and contamination, as aforementioned.

In accordance with an alternative embodiment of the invention, the workpiece is maintained in a region of reduced pressure, although not a very high vacuum region, as by enclosing the workpiece in a work box which fits against the end of the welding system with rubber seals, or the like. The work chamber is exhausted by a crude vacuum pump having a high pumping speed at moderate pressures. In this arrangement, the work itself is manipulated with sliding rods working through graded rubber seals mounted in the work box.

It is an object of the present invention to provide a new and improved method of electron beam welding of a workpiece disposed outside the normal high vacuum environment of the electron gun.

Another object is to adapt a conventional electron welding machine for focusing of the electron beam through an exit orifice and onto a workpiece disposed outside of the machine.

Still another object is to provide a method and apparatus utilizing a buffer chamber principle for passing the beam outwardly of the high vacuum chamber environment and to perform a work function outside the chamber.

Yet another object is to provide a vacuum pumping system compatible for use with an electron gun welding system having provision for working the electron beam outside the high vacuum environment and at or near atmospheric pressure.

An additional object resides in the provision of a method and apparatus for performing a work function with an electron beam outside the high vacuum environment of the electron gun and without requiring that the high vacuum be broken to remove the workpiece.

Figure 2:
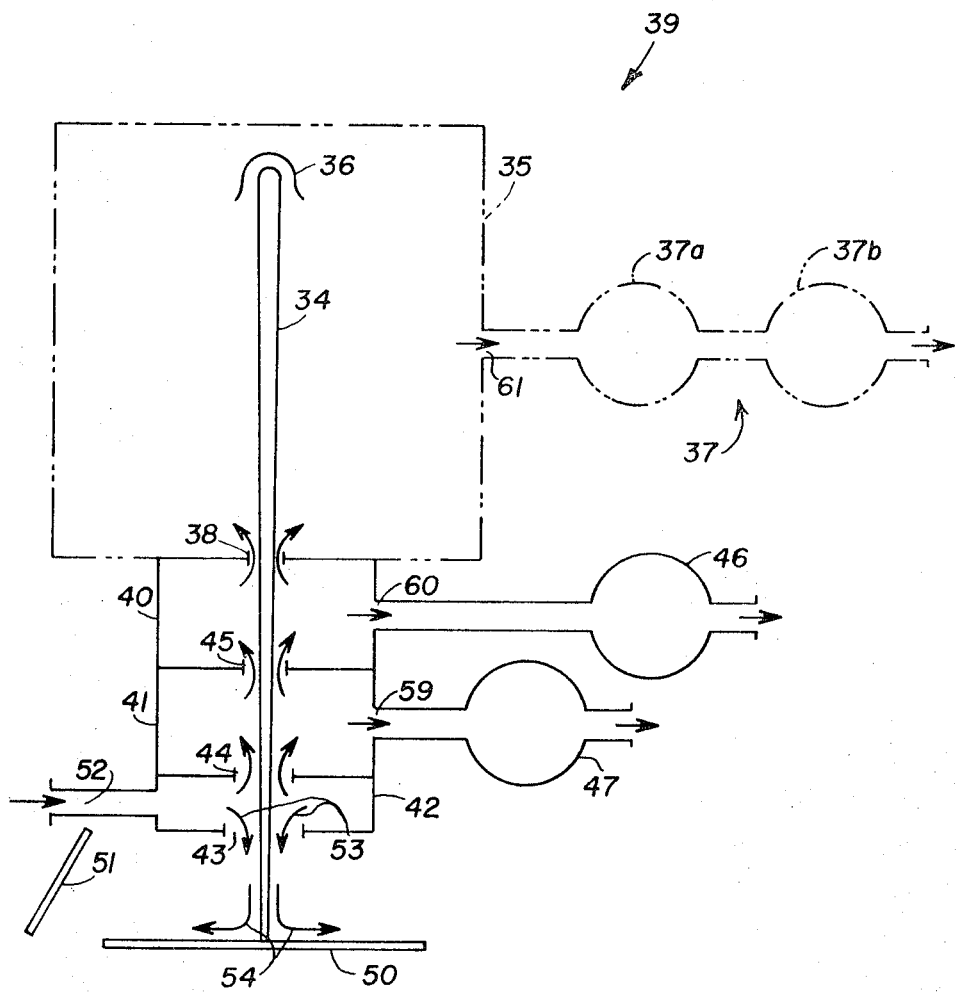

Still other objects, features and advantages of the present invention, as will become more clearly apparent as the description proceeds, are those inherent in or to be implied from the examples of the invention presently to be described with reference to the accompanying drawings wherein:

FIG. 1 is a block diagram arrangement depicting an electron beam and vacuum pump system for working the beam in a welding function within a detachable work box; and FIG. 2 is a block diagram arrangement depicting an electron beam and vacuum pump system for working the beam within an environment of shield gas at or near atmospheric pressure.

Referring now first more particularly to FIG. 1, 5 designates a conventional electron gun chamber and the electron gun is depicted at 6. The gun is assumed to operate with low voltage electrons of the order of 30,000 volts, and chamber 5 is assumed to be exhausted to a high vacuum of the order of 0.1 micron ($10^{14}$ mm. Hg.) by conventional vacuum pumping means 7 including an oil diffusion pump, or the like. Chamber 5, for purposes of the present invention, is modified to include an orifice 8, and three buffer chambers designated 10, 11 and 12, respectively. These chambers, together with the gun chamber 10, comprise the welding system which is generally designated 9. Buffer chamber 12 is exposed or open to atmospheric pressure by way of an orifice 13 and opens to buffer chamber 11 through an orifice 14. Buffer chamber 11, in turn, opens to the buffer chamber 10 through an orifice 15, and buffer chamber 10 opens to the electron gun chamber 5 through orifice 8.

Vacuum pumps 7 and 16 to 18 are connected in series, or in cascade, with a mechanical pump 19, and these vacuum pumps are connected separately to chambers 10 to 12, respectively, the arrangement being such that chambers 10 to 12 are operated at progressively higher pressures.

The electron beam is directed from the gun 11 through the aligned orifices 8, 15, 14, 13 and thence to a workpiece disposed outside the welding system 9 and in the region 20. The workpiece preferably should be in a region of reduced pressure, although it need not be a very high vacuum region. To this end, a work box 21 is set against the end of the welding system 9 as by rubber gaskets 22. The workpiece (not shown) which is disposed in the region 20, as aforementioned, is manipulated therein by sliding rods 23 which extend into the workbox through graded rubber seals 24. Helium is introduced into the workbox chamber as at 25, and the work chamber is exhausted by a crude vacuum pump 26 acting through a fast valve 27 and having a high pumping speed at moderate pressures.

In the event that the workpiece is either too bulky to fit into the workbox 21 or cannot be manipulated therewithin, it should then be placed as close as possible to the exit orifice 13 of the welding system, helium gas being directed, as before, around the beam in its region of impingement with the workpiece, and when necessary, utilizing one or more additional buffer chambers. It will be understood, however, that one buffer chamber, in certain cases, may be sufficient, while in others, a number of chambers may be required, depending upon the characteristics of the pumps available and depending upon the rate of helium influx into the buffer and electron gun chambers. It will be understood, moreover, that electromagnetic or electrostatic focusing elements may be employed, as required, in the buffer chambers to control the beam of electrons. It is recognized, however, that the magnetic lens which forms a part of the conventional electron gun system is adjustable in focal length and thus generally obviates the need for additional focusing means within the buffer chambers, the use of the existing visual optical system thus being permitted in the welding system 9 by the provision of pyrex windows 62 in the vacuum buffer chambers.

The beam alignment arrangement and visual optical system depicted schematically in FIG. 1 are suitable for the purpose herein and are described in the Feb. 23, 1959 issue of *American Machinist* in an article entitled "Electrons Shot from Guns Make High-Purity Welds" to which reference may be had for details of construction and operation. It suffices herein to identify elements 1 and 2 as electromagnetic coils which serve to align and deflect the beam. Element 3 is the magnetic lens, and the numeral 4 generally designates a light microscope for optically viewing the position of the beam on the workpiece.

Manufacturers of electron gun welding equipment currently specify beam diameters of the order of 0.007 to 0.010 inch and, accordingly, a diameter of the order of 0.020 inch is used for the exit orifice 13. Since the electron gun 11 contains provision for steering the beam, orifices 13 to 15 may be aligned mechanically and the beam aimed to pass through them.

In determining the pump requirements, it is assumed that helium surrounds the exit orifice 13 at an effective temperature $T13$ of 727° C. or 1000° K. It is assumed further that pump 18 for exhausting chamber 12 via exit orifice 28 is a Kinney Pump No. KS-13 operating at the rate of flow $dV28/dt$ of 10 cubic feet per minute or 4.7 liters per second. The pressure $P21$ in the workbox 21 is taken as atmospheric or 76 cm. Hg. Thus, $P21 = 76$ cm. Hg. $dV28/dt = 4.7$ liters/second.

The rate of flow $\dfrac{dV13}{dt}$ into the chamber 12 via the exit orifice 13 is determined from the formula $$\frac{dV13}{dt} = A\sqrt{13.2\ T13/M} = 0.115 \text{ liter/second}$$

where
$dV13$ = incremental volume through orifice 13
$D13 = 0.020$ inch diameter of orifice 13
$A13 = 0.002$ cm.$^2$ area of orifice 13
$T13 = 1000°$ K.
$M = 4$ for helium (molecular weight of helium atom).

This formula is referenced in "Procedures in Experimental Physics" John Strong, Prentice Hall, Inc., New York, 1938.
The pressure $P12$ in buffer chamber 12 thus becomes $P12 = (76 \times 0.115)/4.7 = 2$ cm. Hg.

Assuming an aperture diameter of 0.025 inch for orifice 14, and that helium surround the orifice 14 at an effective temperature $T14$ for 27° C or 300° K,
$D14 = 0.025$ inch
$A14 = 0.003$ cm$^2$
$P12 = 2$ cm. Hg. = 20 mm. Hg., and
$T14 = 300°$ K.
Then the rate of flow $dV14/dt$ into the chamber 11 via the orifice 14 becomes
$dV14/dt = 0.1$ liters/second.
Assuming further that pump 17 acting through orifice 29 for exhausting chamber 11 is a Kinney No. KC8, then it may be assumed that
$dV29/dt = 2.5$ liters/second.
Then, the pressure $P11$ in buffer chamber 11 becomes
$P11 = (20 \times 0.1)/2.5 = B0.8$ mm.
Assuming an aperture diameter of 0.030 inch for orifice 15, and that helium surrounds this orifice at an effective temperature $T15$ of 27° C or 300° K,
$D15 = 0.030$ inch
$A15 = 0.004$ cm.$^2$
$P11 = 0.8$ mm.
$T15 = 300°$ K
Then the rate of flow $dV15/dt$ into the electron gun chamber 10 via the orifice 15 becomes
$dV15/dt = 0.13$ liters/second.
Assuming further that pump 16 acting through orifice 30 for exhausting chamber 10 is an oil diffusion pump having a pumping speed of 50 liters/seconds, then
$dV30/dt = 50$ liters/second.
Thus, the pressure $P10$ in the buffer chamber 10 becomes
$P10 = (0.8 \times 0.13)/50 = B2 \times 10^{13}$ mm. Hg. = $2\mu$ (micron).

The fourth aperture 8 in the electron gun chamber 5 is not considered critical, the pump 7 for the electron gun chamber having adequate capacity to easily handle leakage from 2 microns. Assuming, however, an aperture diameter of 0.040 for orifice 8, and that helium surrounds this orifice at an effective temperature $T8$ of 27° C or 300° K,
$D8 = 0.040$ inch
$A8 = 0.008$ cm.$^2$
$P10 = 2\mu$ or $2 \times 10^{13}$ mm. Hg.
$T8 = 300°$ K
Then the rate of flow $dV8/dt$ into the electron gun chamber 5 via the orifice 8 becomes
$dV8/dt = 0.250$ liters/second.
Assuming further that pump 7 acting through orifice 31 for exhausting electron gun chamber 5 is an oil diffusion pump having a pumping speed of 50 liters/second, then
$dV31/dt = 50$ liters/second
Thus, the pressure $P5$ in the electron gum chamber 5 becomes
$P5 = (2 \times 10^{13} \times 0.25)/50 = 10^{15}$ mm. Hg.
or 0.01 micron.
Thus, the existing pumping system 7 is more than adequate to maintain the estimated pressure of 0.1 micron for the electron gun chamber 5, and the size of the orifice 8, moreover, is thus not seen to be critical.

If workbox 21 is maintained at a reduced pressure such as 2 cm. Hg., orifice 8 and pump 7 may be eliminated since chambers 12, 11, and 10 would all be operating at much lower pressures. In this case, of course, different capacity pumps would be used at 16 to 19.

Another advantage of operating the workbox at reduced pressure is that another shield gas such as argon would be satisfactory since its absorption of beam energy at low pressure is negligible.

Referring now to FIG. 2, there is shown thereon a welding system generally designated 39 which comprises a modification of a Hamilton Electrona 2KW, 100 KV Electron Beam Welder, disclosed in dashed lines. As shown, this welder comprises an electron gun chamber 35, an electron emitter 36, from which is generated the electron beam 34, and a pumping system generally designated 37 connected as at 61 to exhaust the electron gun chamber to a high vacuum of the order of 0.1 micron. Pumping system 37 comprises an oil diffusion pump 37a having a capacity of 100 liters per second at the pressure of $10^{14}$ mm. Hg. (0.1 micron) when operated into the rotary force pump 37b.

In the modification of welder 35—37, an exit orifice 38 in chamber 35 opens into a first buffer chamber 40 which is assumed to operate at a pressure of 0.1 mm. Hg. Buffer chamber 40, in turn, has an exit orifice 45 which opens into a second buffer chamber 41 which is assumed to operate at a pressure of 5 mm. Hg. Buffer chamber 41 has an exit orifice 44 which opens into a helium chamber 42 which, in turn, has an exit orifice 43 which opens into the atmosphere in the region of the workpiece 50.

Appropriate shielding depicted at 51 is employed in this region for the protection of operating personnel. For operating potentials of 15kv. or less, the X-rays generated by the electron beam striking the workpiece are "soft", of long wavelength, of low intensity and do not present a radiation hazard to nearby personnel. Above 15kv. potential, hard X-rays of short wavelength and high intensities are emitted. The intensity increases with increase in potential. The hard rays are more penetrating and present a radiation hazard to operating personnel. Since the exemplified Hamilton Electrona welder warms up at 30 kv. and operates at voltages from 50 kv. to 100 kv., shielding such as depicted at 51 is required.

Orifices 38, 45, 44 and 43 are mechanically aligned for passage of beam 34 therethrough or alternatively, these orifices may initially be burned through metal diaphragms or inserts 63, FIG. 1 provided in pyrex windows 62 located at the orifices for visual optical purposes, as aforedescribed.

The herein exemplified Hamilton Electrona welder has viewing systems which consists of a stereoscopic binocular microscope for use with a Rogowski cup and a viewing port with a mirror inside the gun for use with a Steigerwald cup. These viewing systems can be used with the herein disclosed buffer chamber adaptation by use of the aforedescribed pyrex windows 62 in the buffer chambers.

Orifices 44, 45 and 38 are assumed to have diameters each of the order of 0.020 inch, based on beam 34 having a diameter of from 0.007 to 0.010 inch. Exit orifice 43 for helium chamber 42, however, is assumed to have a much larger diameter of the order of 0.30 inch.

Helium gas at or above atmospheric pressure is introduced into chamber chamber 42 by way of inlet 52 therein and leaves the chamber by way of exit orifice 43 in surrounding relation to electron beam 34, as depicted by the arrows 53. The helium gas then bathes a workpiece 50 in the region of impingement of the beam therewith as depicted by the arrows 54. The gas flow rate is assumed to be of the order of 20ft.³/hour which corresponds to the flow required for ordinary TIG welding wherein the inert gas flows through an electrode holder and is discharged through an annular orifice around the electrode. The flow rate for helium through a 0.38 inch O.D. orifice using a 0.040 inch diameter electrode is approximately 20ft.³/hours. Accordingly, exit orifice 43 for helium chamber 42 is given the corresponding diameter of 0.30 inch, as aforementioned.

Buffer chamber 40 is exhausted separately through orifice 60, as by a rotary force pump having an actual nominal capacity of 10 c.f.m. and having an estimated operating speed of 5.59 c.f.m. at the assumed chamber pressure of 0.1 mm. Hg., or 2.78 liters/second at the assumed chamber pressure of 0.1 mm. Hg. and for the assumed 0.020 inch diameter of beam exit orifice 45 of chamber 40. Similarly, chamber 41 is exhausted separately through orifice 59, as by a rotary force pump having an actual nominal capacity of 20 c.f.m. and having an estimated operating speed of 17 c.f.m. at the assumed chamber pressure of 5 mm. Hg. and for the assumed 0.020 diameter of beam exit orifice 44 of chamber 41.

In accordance with the buffer chamber technique, as herein disclosed and employed, the flow into each buffer chamber is sonic limited at the orifice, and the flow out of each chamber is the sum of its pump capacity and the flow through the next orifice into the next chamber of increased vacuum. For equilibrium flow conditions, after operating pressures in the vacuum chambers have been reached, the weight flow into each chamber equals the weight flow out of the chamber. As a result of this arrangement and the assumed orifice diameters, pressures and pumping speeds for vacuum chambers 35, 40 and 41, there would be an estimated flow of 58 liters/second of helium into the gun chamber 35 whose pumping system 37 has the aforementioned nominal capacity of 100 liters per second at the assumed pressure of $10^{14}$ mm. Hg. This leaves 42 liters/second pump capacity for the leakage of chamber 35 other than through its beam exit orifice 38.

The example of FIG. 2 thus shows how one buffer chamber may be eliminated by using faster pumps, and generally indicates the flexibility of buffer chamber and pumping system design.

When the electron beam is traveling through helium at atmospheric pressure, the distance should be less than 1 inch. When the beam is traveling through a work box, or the like, at reduced pressure, the range may be extended inversely as the ratio of the work box pressure to atmospheric pressure.

The distance an electron could travel in helium at standard atmospheric pressure and temperature is about 4 inches at 30 kv. potential. For one inch travel in helium, there would be approximately 25 percent power loss. Since more than 25 percent power loss might seriously impair the welding capabilities of the machine, one inch is considered to be a practical maximum distance.

A production welding rate of 14 inches/minute can be obtained for the following materials and gages:

| Material: | Gage |
|---|---|
| AISI 321 | 0.005–0.5 |
| Aluminum | 0.010–0.5 |
| Columbium | 0.005–0.5 |
| Copper | 0.125–0.5 |
| Inconel X | 0.010–0.125 |
| Nickel | 0.010–0.125 |
| Titanium | 0.010–0.125 |

This welding rate can be obtained with considerably less than the maximum power output of the welder. The welding speeds at maximum power (2kw. at 100 kv.) and the power required for a welding rate of 14 inches/minute are given in the following table.

| Material | Gage | Melting point (° F.) | Theoretical welding speed (in./min. at Max. Pwr.) | Welding power (watts at 14″/min.) |
|---|---|---|---|---|
| Aluminum | .010 / .50 | 1,190 | 465,000 / 188 | .09 / 223.00 |
| Copper | .125 / .50 | 1,980 | 1,210 / 76 | 34.80 / 554.00 |
| Inconel X | .010 / .125 | 2,540 | 91,000 / 585 | .46 / 71.70 |
| AISI 321 | .005 / .500 | 2,550 | 337,000 / 34 | .13 / 1250.00 |
| Nickel | .010 / .125 | 2,615 | 114,000 / 728 | .37 / 57.80 |
| Titanium | .010 / .125 | 3,300 | 156,000 / 1,000 | .27 / 42.00 |
| Columbium | .005 / .50 | 4,380 | 497,000 / 50 | .80 / 840.00 |

These power requirements are based on the following criteria:

1. The heat required to bring a unit length (1 inch) of the material from room temperature to the melting temperature.

2. A welding machine operating efficiency of 75 percent assuming a 25 percent beam energy loss in the helium shield gas.

As may be seen from the table, the theoretical welding rate varies from 34 inches/minute for 321 steel of 0.50 thickness to 497,000 inches/minute for columbium 0.005 thickness. The range of power required for the specified welding rate of 14 inches/minute varies from 1250 watts for 321 steel 0.50 thickness to 0.08 watts for columbium 0.005 thickness.

From the foregoing it should now be apparent that a new and improved electron beam welding method and system has been provided which is well adapted to fulfill the aforestated objects of the invention and while the same has been disclosed in relation to certain examples which give satisfactory results, other examples and embodiments of the invention may suggest themselves to those skilled in the art to which the invention most nearly appertains without departing from the scope of the invention as defined in the appended claims.

What I claim and desire to be secured by Letters Patent of the United States is:

1. Apparatus for bringing an electron beam outside the high vacuum chamber of its electron gun to direct the same onto a workpiece, comprising beam aligning means and a visual optical system for viewing the position of the beam on the workpiece, at least one buffer vacuum chamber, said high vacuum chamber and said buffer chamber having pyrex windows disposed within the field of view of said optical system and having aligned flow limiting orifices drilled in said windows for passing the beam from said high vacuum chamber to said workpiece, one of said orifices interconnecting said high vacuum and buffer chambers and the other of said orifices being the exit orifice adjacent the workpiece, means for surrounding the beam with helium shield gas in the region thereof between said exit orifice and the workpiece, and pumping means individual to said chambers for separately pumping the same.

2. In the method of performing a work function on a workpiece with an electron beam in a gaseous environment at or near atmospheric pressure, the steps of generating and propagating the beam in a high vacuum environment having a pressure of the order of $10^{-4}$ mm. Hg, directing and passing the beam from said high vacuum environment through a plurality of intermediate regions of progressively increased pressure, thence through and in contacting relation with the helium gas disposed within a gaseous region of helium shield gas at or above atmospheric pressure, and thence to the workpiece through and in contacting relation with the surrounding helium shield gas emitted from said gaseous region, and separately pumping said intermediate regions to maintain predetermined pressures therein.

3. In the method of claim 2, the step of passing said beam into and through each of said regions by way of flow limiting orifices.

4. In the method of claim 3, the step of pumping each of said regions at a speed related to the size of the inlet orifice, the molecular weight of the atoms in said gaseous environment, and the absolute temperature of the gas at the orifice in accordance with the equation
where
$$\frac{dV}{dt} = A\ 13.2\ T/M$$
dV = incremental volume
dt = incremental time
A = area of orifice
T = absolute temperature
M = molecular weight of gas.

5. The method of performing a work function with an electron beam directed on a workpiece disposed within the free atmosphere and outside the high vacuum environment of the electron gun which comprises the steps of passing the beam through an exit orifice, emitting helium shield gas through said orifice in surrounding relation to said beam passing therethrough and into the free atmosphere at or above atmospheric pressure, surrounding the beam in the region between said exit orifice and the workpiece with said shield gas and passing the beam through the helium gas in said region, and positioning the workpiece relative to said exit orifice in accordance with the rate of energy loss of the beam through said shield gas.

6. The method as in claim 5, said workpiece being spaced on the order of up to one inch from said exit orifice.

7. The method of performing a work function with an electron beam directed on a workpiece disposed within the free atmosphere and outside the high vacuum environment of the electron gun which comprises the steps of generating and propagating the electron beam in a high vacuum chamber maintained at a pressure of the order of $10^{-4}$ mm. Hg, directing the beam to the workpiece through a plurality of aligned flow limiting orifices respectively defining therebetween a plurality of vacuum buffer chambers of progressively increased and predetermined pressures and through and in contacting relation with the helium gas disposed within a gaseous chamber having helium shield gas therein at or above atmospheric pressure, surrounding and contacting the beam in the region between the workpiece and the adjacent one of said orifices with said shield gas and passing the beam through the helium gas in said region, and separately pumping said buffer chambers at speeds respectively providing said predetermined buffer chamber pressures.

8. Apparatus for brining an electron beam outside the high vacuum chamber of its electron gun to direct the same onto a workpiece, comprising at least one buffer vacuum chamber having aligned flow limiting orifices for passing the beam from said high vacuum chamber to said workpiece, one of said orifices interconnecting said high vacuum and buffer chambers and the other of said orifices being the exit orifice adjacent the workpiece, means for surrounding the beam with helium shield gas in the region thereof between said exit orifice and the workpiece and passing the beam through the helium gas in said region, and pumping means individual to said chambers for separately pumping the same, said means for surrounding the beam with helium shield gas comprising a shield gas chamber adjoining said buffer chamber and having an inlet for receiving said helium shield gas and an outlet aligned with said orifices for passing said beam and helium shield gas therethrough in surrounding relation to the electron beam.

9. Apparatus as in claim 8, said pumping means having speeds related to the size of said orifices and the temperature and molecular weight of said helium shield gas therein.

10. Apparatus as in claim 8 and including X-ray shielding in the region around the workpiece.

11. Apparatus as in claim 8, said helium shield gas being at a pressure at or above atmospheric pressure.

12. Apparatus as in claim 8, said workpiece being spaced as closely as possible to said outlet of the shield gas chamber and in accordance with acceptable energy losses of the beam as determined by the potential of the electrons and the temperature and pressure of the helium shield gas.